United States Patent
Fitzgerald

(10) Patent No.: US 7,085,263 B1
(45) Date of Patent: Aug. 1, 2006

(54) NETWORK TELEPHONY DEVICES, SOFTWARES AND METHODS FOR DISCONTINUING TRANSMITTING MUSIC-ON-HOLD

(75) Inventor: Cary Fitzgerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 947 days.

(21) Appl. No.: 10/038,440

(22) Filed: Jan. 3, 2002

(51) Int. Cl.
*H04L 12/66* (2006.01)
*H04M 1/00* (2006.01)

(52) U.S. Cl. .................................. 370/352; 379/393
(58) Field of Classification Search ................ None
See application file for complete search history.

(56) References Cited

U.S. PATENT DOCUMENTS

| | | | |
|---|---|---|---|
| 6,353,662 B1 * | 3/2002 | Foladare et al. | 379/101.01 |
| 6,404,764 B1 * | 6/2002 | Jones et al. | 370/352 |
| 6,694,012 B1 * | 2/2004 | Posthuma | 379/393 |
| 2002/0119795 A1 * | 8/2002 | Dorenbosch | 455/509 |
| 2002/0136384 A1 * | 9/2002 | McCormack et al. | 379/215.01 |

* cited by examiner

*Primary Examiner*—Steven Nguyen
(74) *Attorney, Agent, or Firm*—Marger Johnson & McCollom, P.C.

(57) ABSTRACT

Devices, softwares and methods for network telephony sense if a party that has been placed on hold is talking. If it does, transmitting on hold music or other characteristic sound is discontinued. Accordingly, the other party is not annoyed, such as in a conference call scenario.

36 Claims, 4 Drawing Sheets

US 7,085,263 B1

NETWORK TELEPHONY DEVICES, SOFTWARES AND METHODS FOR DISCONTINUING TRANSMITTING MUSIC-ON-HOLD

BACKGROUND OF THE INVENTION

1. Field of the Invention

The present invention is related to the field of network telephony, and more specifically to devices, softwares and methods for discontinuing transmitting music-on-hold.

2. Description of the Related Art

Networks, such as the internet, are increasingly used for telephony. The voice signals of the conversations are digitized, and then sent as packets through the network.

Devices have developed for network telephony. Such devices include voice gateways and Internet Protocol (IP) telephones. These devices sometimes have advanced features.

Referring to FIG. 1, an advanced feature of network telephony devices is described, which is called music on hold. A network 110 is provided for packetized network telephony. A device 120 communicates with a device 130 via network 110 via a communication line 115 through network 110.

Sometimes a "HOLD" button 124 on device 120 is pressed. This places the user of the other telephone device 130 on hold. The call may then be transferred to another user, or recovered later.

The feature of music on hold is for device 120 to also transmit music 126 along line 115 to device 130. This way the user 130 would be less upset at having to wait. Music 126 is transmitted as voice.

Referring to FIG. 2, a problem is described with the music on hold feature of FIG. 1. A network 210 is adapted for supporting network telephony for telephone devices 120, 230, 240, 250.

Moreover, network 210 includes a conference bridge 220. Telephone devices 120, 230, 240, 250 can make a joint conference call, by establishing respective connections 225, 235, 245, 255 with conference bridge 220. Conference bridge 220 adds at least some of the voice inputs received from the participants, and plays them back to all telephone devices 120, 230, 240, 250.

The problem arises when device 120 puts connection 225 on hold. This results in music 226 to be played from device 120 to conference bridge 220, and thus to all other devices 230, 240 and 250. This is annoying, as their users might want to continue the conference, and now they have to speak "over" the music.

A variation in the prior art does not help, either. Instead of music 226, device 120 emits distinct beeps every 5 seconds. These beeps are transferred to users of devices 230, 240 and 250, again annoying them.

BRIEF SUMMARY OF THE INVENTION

The present invention overcomes these problems and limitations of the prior art.

Generally, the present invention provides devices, softwares and methods for sensing if other parties are talking, who have been placed on hold. If they do, it discontinues transmitting the on hold music and/or other sound. Accordingly, the other party is not annoyed, if they start speaking.

It will be appreciated that the invention works equally well in a conference scenario and in a two speaker situation. This and other features and advantages of the invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for sensing if other parties are talking, who have been placed on hold. If they do, it discontinues transmitting the on hold music. The invention is now described in more detail.

Figure 3:
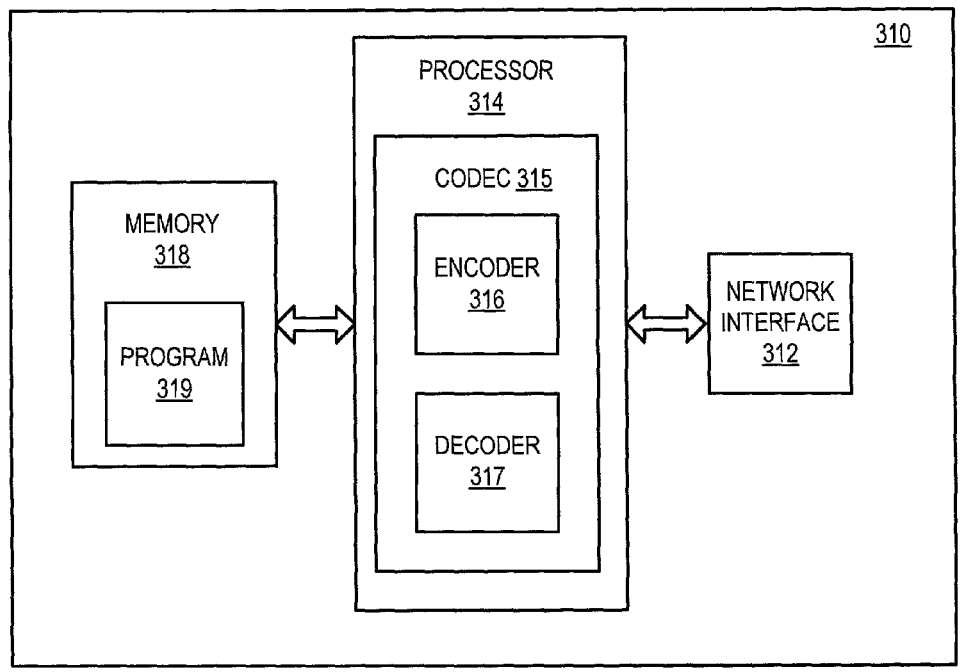
FIG. 3 is a block diagram of a device made according to an embodiment of the present invention.

Referring now to FIG. 3, a device 310 made according to an embodiment of the invention is described in more detail. Device 310 may be any voice network switch, such as a voice gateway, an IP telephone, etc.

Device 310 has a network interface 312 for interfacing with a network, such as the internet or any other network that can support transmission of voice data.

Device 310 also has a processor 314 coupled with network interface 312. Processor 314 may be implemented as a Digital Signal Processor (DSP), Central Processing Unit (CPU), or any other equivalent way known in the art. Processor 314 may include a codec 315, which is made from an encoder 316 and a decoder 317.

Device 310 may additionally include a memory 318, on which a program 319 may reside. Functions of processor 314 may be controlled by program 319, as will become apparent from the below.

Briefly, device 310 senses if other parties are talking, even after placing them on hold. If they do, it discontinues transmitting the on hold music and/or other sound that indicates hold.

Figure 1:
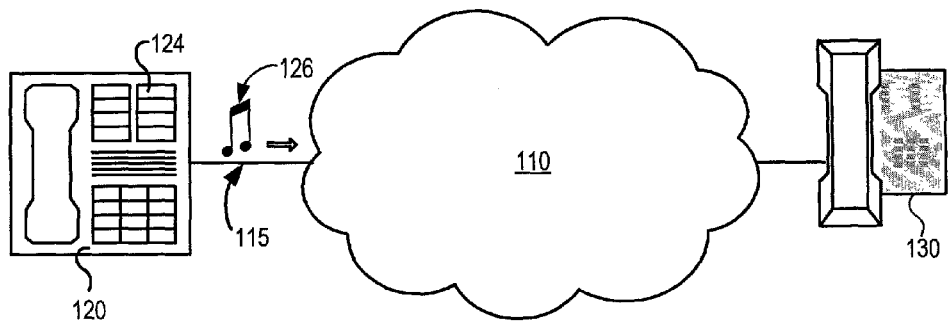
FIG. 1 is a diagram for illustrating a device in the prior art music on hold feature.
Figure 2:
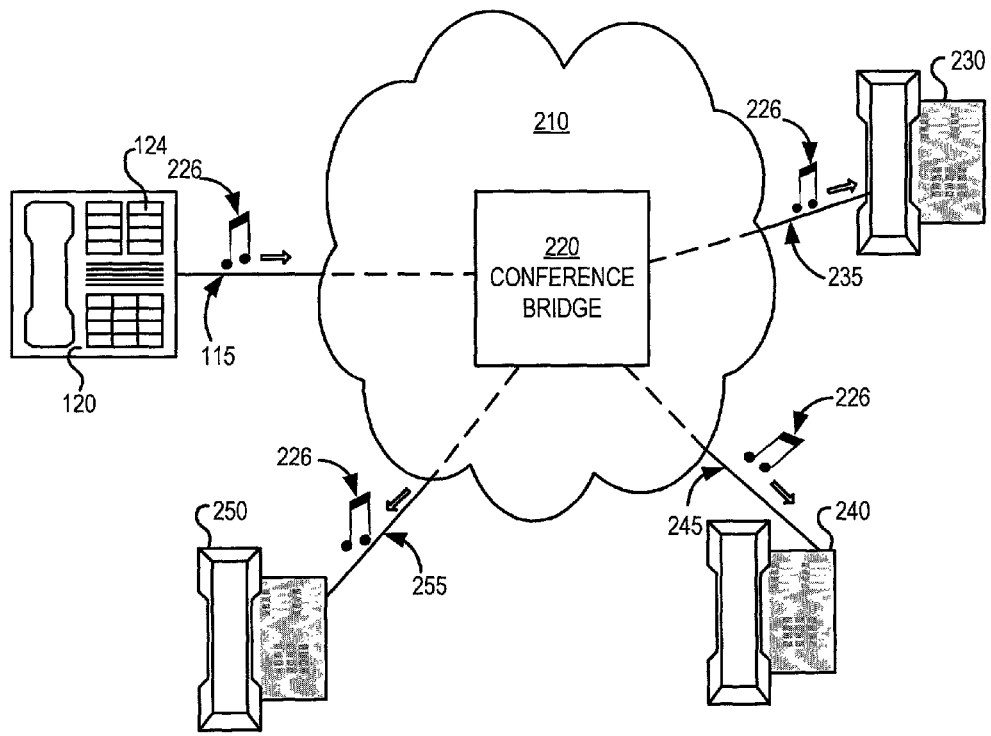
FIG. 2 is a network diagram for illustrating how the device of FIG. 1 is a problem in a conference call scenario.
Figure 4:
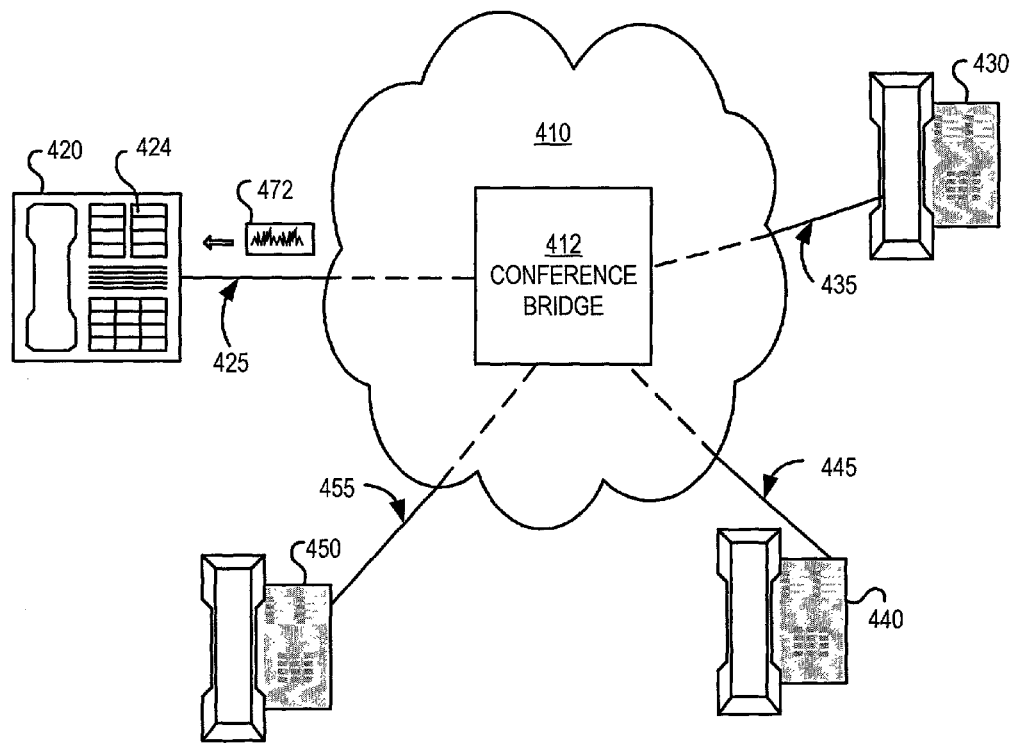
FIG. 4 is a network diagram for illustrating how an IP telephone made according to an embodiment of the invention does not generate a problem in a conference call scenario.

Referring now to FIG. 4, a network 410 includes a conference bridge 412, which may optionally be made similarly to conference bridge 220 of FIG. 2. An IP telephone 420 is made according to an embodiment of the invention, for example according to device 310 of FIG. 3. In the embodiment of FIG. 4, IP telephone 420 has a "HOLD" button 424, for placing another party on hold. In addition, it can transmit on hold music/sound to those on hold, which means either music or sound or both.

In the embodiment of FIG. 4, IP telephone 420 establishes a VoIP connection with conference bridge 412. In addition, other telephone devices 430, 440, 450 establish VoIP connections 435, 445, 455 with bridge 412, to establish a conference call among themselves and with IP telephone 420. Telephone devices 430, 440, 450 may be made according to the invention, but this is not necessary.

Briefly, IP telephone 420 may place VoIP connection 425 on hold. If the other users continue speaking, one or more packets 472 will be received by device 420. If such is received, then IP telephone 420 withholds transmitting the on-hold music/sound.

Figure 5:
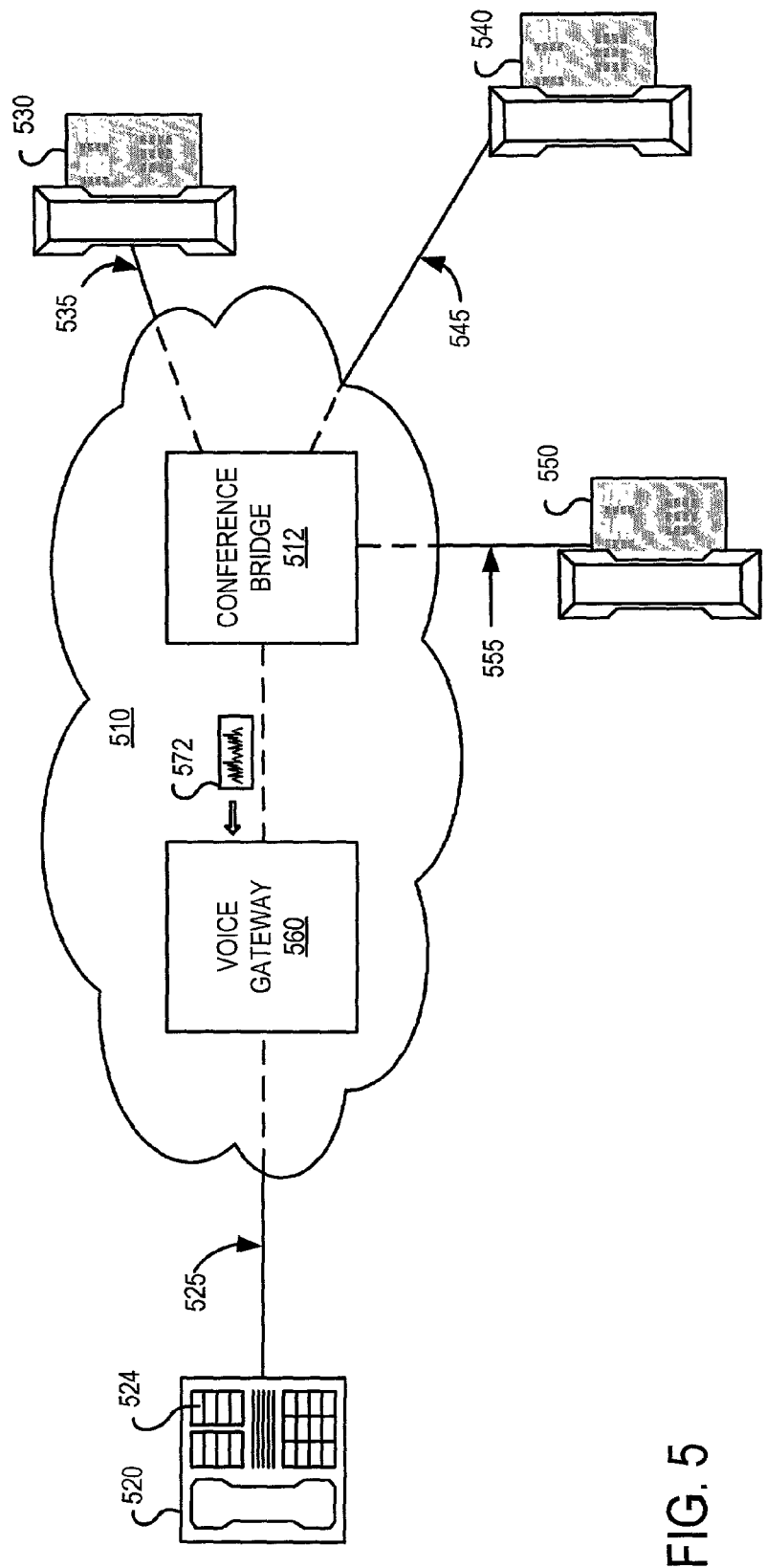
FIG. 5 is a network diagram for illustrating how a voice gateway made according to an embodiment of the invention does not generate a problem in a conference call scenario.

Referring now to FIG. 5, a network 510 includes a conference bridge 512, which may optionally be made similarly to conference bridge 220 of FIG. 2. Telephone devices 520, 530, 540, 550, none of which need be made according to the invention, establish VoIP connections 525, 535, 545, 555 with bridge 512, to establish a conference call among themselves.

Telephone 520 has a "HOLD" button 524, for placing another party on hold. In addition, it can transmit on hold music/sound to those on hold.

VoIP connection 525 is made through a voice gateway 560. Voice gateway 560 is made according to an embodiment of the invention, and permits telephone 520 to be an ordinary (non-IP) telephone device. Accordingly, VoIP connection 525 has a first portion between telephone 520 and gateway 560, and a second portion between gateway 560 and bridge 512.

Briefly, telephone 520 may place VoIP connection 525 on hold. If the other users continue speaking, one or more packets 572 will be received by device 560. If such is received, then device 560 withholds retransmitting the on-hold music/sound from device 520.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 6:
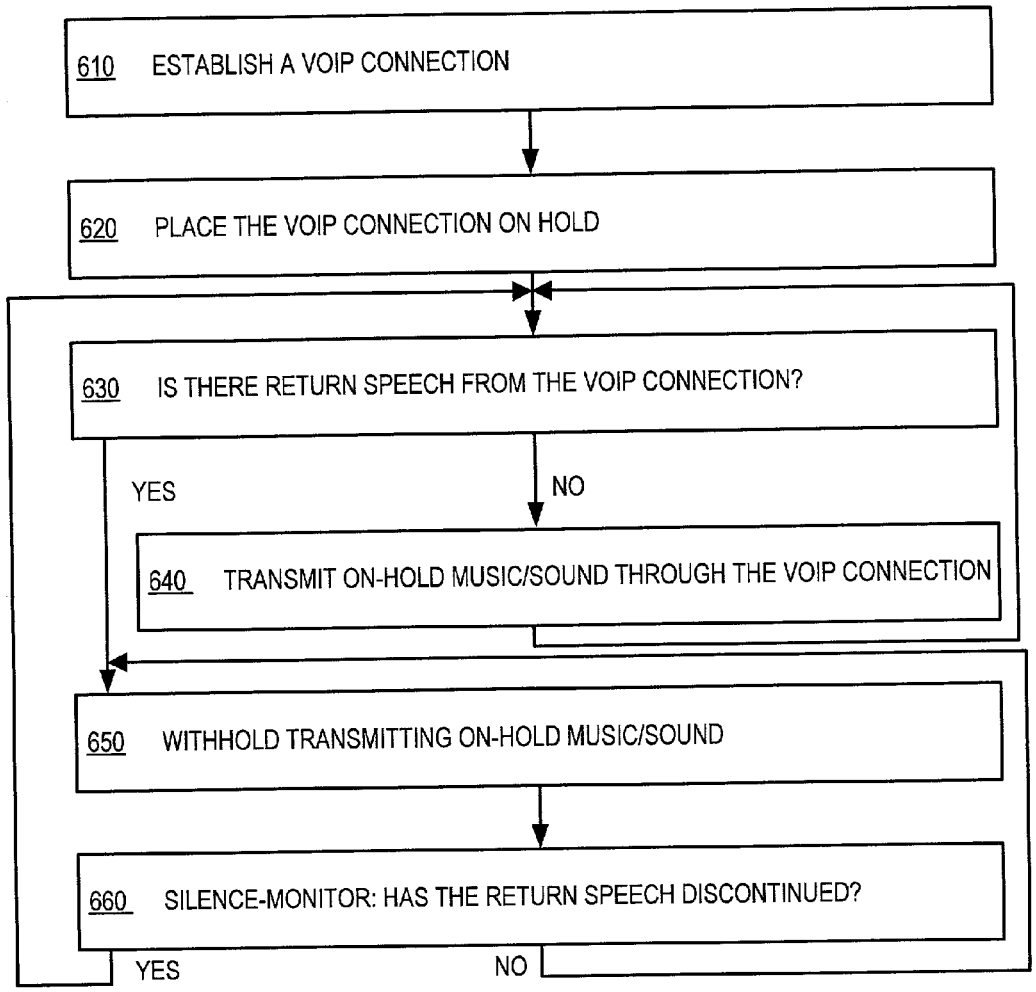
FIG. 6 is a flowchart illustrating a method according to an embodiment of the present invention.

Referring now to FIG. 6, a flowchart 600 is used to illustrate a method according to an embodiment of the invention. The method of flowchart 600 may also be practiced by IP telephone 420 and/or voice gateway 560, as seen in FIG. 4 and FIG. 5 respectively.

According to a box 610, a VoIP connection is established.

According to an optional next box 620, the VoIP connection is placed on hold.

According to a next box 630, it is determined if there is return speech from the VoIP connection which has been placed on hold. This can be performed in a number of ways according to the invention. For example, determining may be performed by interpreting a VAD (Voice Activation Detection) ON/OFF event. Alternately, if the VoIP connection is over a network voice path, and determining may be performed by monitoring the voice path for return packets. Any return packets may be analyzed to determine whether they encode speech.

Analyzing for speech may be performed in a number of ways. For example, analyzing may be for speech energy that corresponds to speech sustained for a predetermined time minimum. A value for the time minimum that works is 3 sec.

If there is no speech at box 630, then according to next box 640, on-hold music/sound is transmitted through the VoIP connection. Execution then returns to box 630, after some time, or after an interrupt, depending on programming.

If there is speech detected at box 630, then according to a next box 650, transmitting an on-hold music/sound is withheld. This means that it is not started, or discontinued if it had been started.

According to an optional next box 660, silence-monitoring is performed to determine if the return speech has discontinued. If not, execution returns to box 650. If yes, execution returns to box 630.

Silence-monitoring can be performed in a number of ways according to the invention. For example, determining may be performed by interpreting a VAD (Voice Activation Detection) ON/OFF event. Alternately, it may be performed by interpreting a received SID (Silence Identification) packet.

Alternately, if the VoIP connection is over a network voice path, and silence-monitoring may be performed by monitoring the voice path for return packets. Any return packets may be analyzed to determine whether they encode speech, as per the above.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. For example, the teachings of the invention may be practiced with conventional telephony as opposed to network telephony. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
a network interface for coupling to a network; and
a processor coupled with the network interface, in which the processor is adapted to:
establish a VoIP connection;
place the VoIP connection on hold;
detect whether there is return speech from the VoIP connection that has been placed on hold;
measure how long the detected return speech is sustained;
determine whether the detected return speech is sustained for at least a predetermined amount of time;
withhold transmitting on-hold music/sound through the VoIP connection when the detected return speech is sustained for at least a predetermined amount of time; and
continue transmitting on-hold music/sound through the VoIP connection when the detected return speech is not sustained for at least a predetermined amount of time.

2. The device of claim 1, in which
detecting is performed by interpreting a Voice Activation Detection (VAD) ON/OFF event.

3. The device of claim 1, in which
the VoIP connection is over a network voice path, and detecting is performed by:
monitoring the voice path for return packets; and
analyzing to determine whether the return packets encode speech.

4. The device of claim 3, wherein the predetermined period of time is equal to three seconds.

5. The device of claim 1, in which the processor is further adapted to:
silence-monitor to determine whether prior detected return speech has discontinued; and
if so, transmit on-hold music/sound through the VoIP connection.

6. The device of claim 5, in which
silence-monitoring is performed by interpreting a Voice Activation Detection (VAD) ON/OFF event.

7. The device of claim 5, in which
silence-monitoring is performed by interpreting a received Silence Identification (SID) packet.

8. The device of claim 5, in which
the VoIP connection is over a network voice path, and silence-monitoring is performed by:
monitoring the voice path for return packets; and
analyzing to determine whether the return packets encode silence.

9. The device of claim 8, in which
analyzing is for speech energy that corresponds to silence sustained for a predetermined time minimum.

10. A device comprising:
means for establishing a VoIP connection;
means for placing the VoIP connection on hold;
means for monitoring the VoIP connection that has been placed on hold to determine, according to a Silence identification (SID) packet, whether there is return speech;
means for withholding transmitting on-hold music/sound through the VoIP connection in response to the SID packet determination indicating that there is return speech; and
means for continuing transmitting on-hold music/sound through the VoIP connection when the SID packet determination indicates that there is no return speech.

11. The device of claim 10, in which
the means for monitoring includes means for interpreting a Voice Activation Detection (VAD) ON/OFF event.

12. The device of claim 10, in which
the VoIP connection is over a network voice path, and the means for monitoring includes means for analyzing to determine whether return packets encode speech.

13. The device of claim 12, in which
the means for analyzing is for speech energy analyzes for speech sustained for a predetermined time minimum.

14. The device of claim 10, further comprising:
means for silence-monitoring to determine whether prior return speech has discontinued; and
if so, means for transmitting on-hold music/sound through the VoIP connection.

15. The device of claim 14, in which
the means for silence-monitoring includes means for interpreting a Voice Activation Detection (VAD) ON/OFF event.

16. The device of claim 14, in which
the means for silence-monitoring includes means for interpreting a received Silence Identification (SID) packet.

17. The device of claim 14, in which
the VoIP connection is over a network voice path, and the means for silence-monitoring includes:
means for monitoring the voice path for return packets; and
means for analyzing to determine whether the return packets encode silence.

18. The device of claim 17, in which
the means for analyzing is for speech energy analyzes for speech sustained for a predetermined time minimum.

19. An article comprising: a storage medium, the storage medium having instructions stored thereon, in which when the instructions are executed by at least one device, they result in:
establishing a VoIP connection;
placing the VoIP connection on hold;
monitoring the VoIP that has been placed on hold to determine according to a Silence Identification (SID) packet, whether there is return speech;
withholding transmitting on-hold music/sound through the VoIP connection in response to the SID packet determination indicating that there is return speech; and
continuing transmitting on-hold music/sound through the VoIP connection when the SID packet determination indicates that there is no return speech.

20. The article of claim 19, in which monitoring is performed by interpreting a Voice Activation Detection (VAD) ON/OFF event.

21. The article of claim 19, in which
the VoIP connection is over a network voice path, and monitoring is performed by:
checking the voice path for return packets; and
analyzing whether the return packets encode speech.

22. The article of claim 21, in which
analyzing is for speech energy that corresponds to speech sustained for a predetermined time minimum.

23. The article of claim 19, in which the instructions further result in:
silence-monitoring to determine whether prior return speech has discontinued; and
if so, transmitting on-hold music/sound through the VoIP connection.

24. The article of claim 23, in which
silence-monitoring is performed by interpreting a Voice Activation Detection (VAD) ON/OFF event.

25. The article of claim 23, in which
silence-monitoring is performed by interpreting a received Silence Identification (SID) packet.

26. The article of claim 23, in which
the VoIP connection is over a network voice path, and silence-monitoring is performed by:
checking the voice path for return packets; and
analyzing whether the return packets encode silence.

27. The article of claim 26, in which
analyzing is for speech energy that corresponds to silence sustained for a predetermined time minimum.

28. A method comprising:
establishing a VoIP connection;
placing the VoIP connection on hold;
detecting, according to a Silence Identification (SID) packet determination, whether there is return speech from the VoIP connection that has been placed on hold; and
measuring how long the detected return speech is sustained;
determining whether the detected return speech is sustained for at least a predetermined amount of time;
withholding transmitting on-hold music/sound through the VoIP connection in response to a determination that the detected return speech is sustained for at least a predetermined amount of time; and
continuing transmitting on-hold music/sound through the VoIP connection when the detected return speech is not sustained for at least a predetermined amount of time.

29. The method of claim 28, in which
detecting is performed by interpreting a Voice Activation Detection (VAD) ON/OFF event.

30. The method of claim 28, in which
the VoIP connection is over a network voice path, and detecting is performed by:
monitoring the voice path for return packets; and
analyzing to determine whether the return packets encode speech.

31. The method of claim 30, in which
analyzing is for speech energy that corresponds to speech sustained for a predetermined time minimum.

32. The method of claim 28, further comprising:
silence-monitoring to determine whether prior detected return speech has discontinued; and
if so, transmitting on-hold music/sound trough the VoIP connection.

33. The method of claim 32, in which
silence-monitoring is performed by interpreting a Voice Activation Detection (VAD) ON/OFF event.

34. The method of claim 32, in which
silence-monitoring is performed by interpreting a received Silence Identification (SID) packet.

35. The method of claim 32, in which
the VoIP connection is over a network voice path, and silence-monitoring is performed by:
monitoring the voice path for return packets; and
analyzing to determine whether the return packets encode silence.

36. The method of claim 35, in which
analyzing is for speech energy that corresponds to silence sustained for a predetermined time minimum.

* * * * *